(12) United States Patent
Faria et al.

(10) Patent No.: US 8,784,755 B2
(45) Date of Patent: Jul. 22, 2014

(54) PROCESS FOR OBTAINING POTASSIUM CHLORIDE

(75) Inventors: Flavio Marcio de Lima Faria, Belo Horizonte (BR); Marcus de Castro Carvalho Simoes, Belo Horizonte (BR); Antonio F. Pessoa, Buenos Aires (AR)

(73) Assignee: Vale S.A., Rio de Janeiro (BR)

( * ) Notice: Subject to any disclaimer, the term of this patent is extended or adjusted under 35 U.S.C. 154(b) by 0 days.

(21) Appl. No.: 13/399,771

(22) Filed: Feb. 17, 2012

(65) Prior Publication Data

US 2013/0149231 A1 Jun. 13, 2013

Related U.S. Application Data

(60) Provisional application No. 61/444,245, filed on Feb. 18, 2011.

(51) Int. Cl.
 *B01D 7/00* (2006.01)
(52) U.S. Cl.
 USPC .......... 423/184; 423/499.1; 23/302 R; 23/303
(58) Field of Classification Search
 USPC ................ 423/184, 499.1; 23/302 R, 303
 See application file for complete search history.

(56) References Cited

U.S. PATENT DOCUMENTS

| | | | | |
|---|---|---|---|---|
| 4,276,117 A | * | 6/1981 | Geesen | 159/47.1 |
| 4,385,902 A | * | 5/1983 | Haugrud | 23/293 R |
| 4,504,092 A | * | 3/1985 | Bichara et al. | 299/5 |
| 4,997,637 A | * | 3/1991 | Tufts | 423/449.5 |
| 5,198,200 A | * | 3/1993 | Yerushalmi et al. | 423/131 |

* cited by examiner

*Primary Examiner* — Steven Bos
(74) *Attorney, Agent, or Firm* — Arent Fox LLP

(57) ABSTRACT

Aspects of the present invention relate to a process to obtain potassium chloride that includes submitting brine to concentration, separating brine after concentration, resulting in a first solid content and a first liquid content, cooling the first liquid content, separating the first liquid content after cooling, thus resulting in a second solid content and a second liquid content, enriching the second solid content, and separating the second solid content after enrichment, thus resulting in a third solid content and a third liquid content. Aspects of this process are environmentally safe, as the process includes stages using solvents and equipment which does not harm the environment. Moreover, aspects of this process present a significant energy consumption reduction.

17 Claims, 1 Drawing Sheet

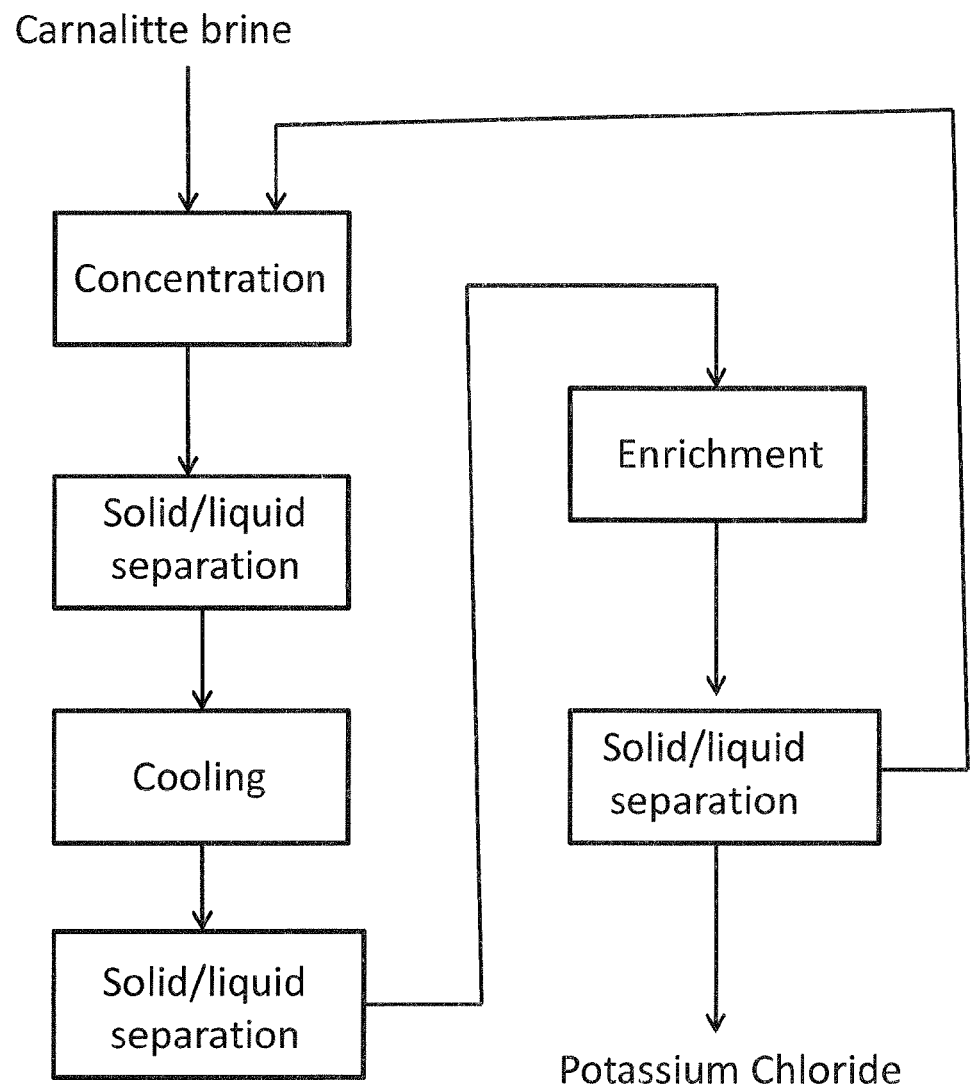

PROCESS FOR OBTAINING POTASSIUM CHLORIDE

The current application claim priority from U.S. Patent Application Ser. No. 61/444,245, filed on Feb. 18, 2011, titled "Process for Obtaining Potassium Chloride," and which is incorporated herein by reference in its entirety.

FIELD OF INVENTION

Aspects of the present invention relate to obtaining potassium chloride from carnallite brines or from brines with high $MgCl_2$ contents, which comprises steps allowing said process to reach a reduction in energy consumption.

BACKGROUND

Potassium chloride is a halide metal salt formed by chloride and potassium. The use of potassium chloride is widely diffused in medical environment as a substitute of this electrolyte in the organism. Potassium chloride is used in cooking as well.

Moreover, potassium chloride is widely used also as a fertilizer to increase productivity in wide range of plantations.

There are some known brine processing routes for production of fertilizing grade potassium chloride, in addition to processes to obtain salts from different sources. However, these routes present significant energy consumption.

BRIEF DESCRIPTION OF THE INVENTION

FIG. 1 is a flow chart illustrating aspects of the present invention relating to a process for obtaining potassium chloride, which includes at least the following steps:
 a) Submitting the brine to concentration;
 b) Separating brine after concentration, resulting in a first solid content and a first liquid content;
 c) Cooling the first liquid content;
 d) Separating the first liquid content after cooling, thus resulting in a second solid content and a second liquid content;
 e) Enriching the second solid content; and
 f) Separating the second solid content after enrichment, thus resulting in a third solid content and a third liquid content.

The step of submitting brine to concentration can be carried out through multistage evaporation, evaporation by thermal vapor recompression—TVR, evaporation by mechanical vapor recompression—MVR, or by combinations of multistage evaporation and/or TVR and/or MVR.

The step of cooling the first liquid content can be carried out by vacuum cooling, cooling through heat exchangers or by a combination of vacuum and cooling through heat exchangers.

The stage of performing the enrichment of the second solid content can be carried out through cold leaching, direct flotation of potassium chloride or elutriation.

The enrichment of the second solid content may also be carried out through combinations between operations of multistage evaporation and thermal vapor recompression—TVR and operations of multistage evaporation by mechanical vapor recompression—MVR.

The process of the present invention may further comprise a brine preheating stage prior to submitting the brine to concentration. This brine preheating can be performed by surface condensers.

DETAILED DESCRIPTION OF THE INVENTION

The following detailed description at any rate is not intended to limit the scope, applicability or configuration of the present invention. More exactly, the following description provides understandings to implement exemplary modalities. When using the teaching provided herein, people skilled in the art will recognize suitable alternatives to be used, without leaving the scope of the present invention.

FIG. 1 is a flow chart illustrating aspects of the present invention relate to a process to obtain potassium chloride, which comprises the following stages:
 a) Submitting the brine to concentration;
 b) Separating the brine after concentration resulting in a first solid content and a first liquid content;
 c) Cooling the first liquid content;
 d) Separating the first liquid content after cooling, thus resulting in a second solid content and a second liquid content;
 e) Enriching the second solid content;
 f) Separating the second solid content after enrichment, thus resulting in a third solid content and a third liquid content.

The brine used in the process of the present invention preferably derives from working by carnallite dissolution that includes a significant potassium chloride, magnesium chloride and sodium chloride content.

Canallite brine or brine that has high potassium chloride, magnesium chloride and sodium chloride content may be obtained from carnallite rocks or natural brine. Obtainment of this brine from carnallite rocks occurs essentially by dissolution of the carnallite rock. Such dissolution may occur in-situ or in the own processing plant. In cases of in-situ dissolution we may highlight the working for dissolution and methods thereof, among which we can mention the "Single Well" and "Dual Wells".

In the "Single Well" method only one well for injection of solvent and brine collections is required. This technique, a central portion of said well is perforated so as to reach preferably the carnallite layer beneath the earth surface. Solvent is injected and the resulting brine is collected in a concentric pipe system.

In the "Dual Wells" method in turn, two wells are perforated near each other. The contact of wells occurs through a cavern formed by means of development of separate cavities with simultaneous solvent injection. At completion of the cavern, one of the wells receives the solvent and the other one provides the resulting brine. In the present invention, brine used in the process may be obtained by above-described methods or by any other known method.

Concentration stage in the present invention is preferably multistage evaporation.

The first solid content resulting from step of the present invention refers essentially to sodium chloride. This material is removed from the process and may be purged, diluted or suffer any other type of physical process to be used in purposes other than those presented herein.

Cooling step preferably refers to two successive cooling substages, the first of which being vacuum cooling and the second, direct cooling.

The second liquid content resulting from step "d" of the process of the present invention is disposal material.

The second solid content resulting from step "d" of the process of the present invention comprises essentially potassium chloride and sodium chloride.

The third solid content resulting from step "f" of the process of the present invention refers essentially to potassium chloride in a suitable content for application, the final purpose of the present invention.

The third solid content resulting from step "f" of the process of the present invention preferably returns back to step "a", feeding brine to suffer a concentration process.

The process of the present invention includes in their preferred modalities:
- Multistage evaporation and sodium chloride crystallization, including sodium chloride separation;
- Vacuum cooling and potassium chloride crystallization;
- Direct cooling either with cold water or saline solution or glycol solutions (e.g., glycol-ethylene) in varied compositions thereof;
- Dewatering (solid-liquid separation);
- Leaching to obtain potassium chloride;
- Evaporation of leached brine or recirculation (mixing with the first brine) of the leached brine in the evaporation stage;

According to various aspect, the process of the present invention comprises the following steps:

a) Submitting brine to evaporation. Preferably, evaporation occurs by multistage evaporation, and it can be performed either partially or fully by mechanical vapor recompression (MVR) or thermal vapor recompression (TVR). Evaporation may be further performed by operations of multistage evaporation and/or MVR and/or TVR;

b) Separating brine after evaporation, resulting in a first solid content and a first liquid content, one of which being a condensate, vapor condensate and a solid, the sodium chloride. Separation can be performed preferably by centrifugation or filtration, or any other known unitary operation for solid/liquid separation;

c) Cooling the first liquid contents by means of substages, with vacuum cooling using cooling water and direct cooling by cold water or saline solution or glycol solutions (e.g., ethylene-glycol) in their several compositions thereof, both substages providing crystallization of potassium chloride and sodium chloride as impurity;

d) Separating the first liquid content after cooling, resulting in a second solid content and a second liquid content. The separation can be performed preferably by centrifugation or filtration, or any known unitary operation for solid/liquid separation. The liquid material containing magnesium chloride and low concentration of potassium chloride is discarded;

e) Leaching the second solid content by using leaching water or condensate generated in the process. Leaching can be performed cold. Alternatively, direct flotation of potassium chloride or elutriation can be used;

f) Separating the second solid content after leaching resulting in a third solid content and a third liquid content. Separation can be performed preferably by centrifugation or filtration, or any known unitary operation for solid/liquids separation. The resulting product is potassium chloride that, after compacted, presents content higher than 95% mass. The third liquid content is sent to step "a" of concentration.

In other various aspects of the process of the present invention, carnallite brine enters the process in a temperature between 20° C. and 70° C.

In these aspects, brine can be preheated preferably in surface condensers. Condensate vapor is collected in condensate storage.

Heated brine circulates in the evaporation and NaCl content is separated. The solution will be concentrated so as no potassium chloride crystallization occurs.

Cooling agents include process water, cooling water and cold water or saline solution or glycol solutions (e.g., glycol-ethylene) in varied compositions thereof.

Vacuum crystallization KCl has a $K_2O$ content of approximately 44% in solvent-free solid. In order to reach business quality, there is a leaching stage, which can be carried out in a sole stage or, preferably, performed in multiple stages. In case of two-stage leaching, in the first substage of cold leaching, the solid contents will be treated as the solution of the second cold leaching substage. Thus, a moderate increase is reached from a $K_2O$ content of approximately 44% to approx. 52% of solvent-free solid.

The solution separated from the cold leaching substage is transferred to the first cold leaching substage. The leached solid content of the first leaching substage is sent to the second substage, where is mixed with leaching water or process condensate, thus increasing potassium chloride concentration in suitable levels to commercialization, of about 96% of content.

Solid content which has dewatered potassium chloride crystallized elements, after the solid-liquid separation stage, is stored or dried in dryers and conditioned thereafter to meet market specifications.

The total quantity of dry potassium chloride is sent to compaction and granulation.

The obtainment process of the present invention contemplates an excellent unitary operation arrangement. Thus, it is possible to increase the number of evaporation stages, performing evaporation in $MgCl_2$ concentrations lower than the conventional routes.

Some advantages of the process of the present invention include:
- Reduction of the overall energy consumption;
- Reduction of process operating costs;
- Increased vapor saving (ton of evaporated water×ton of fed boiler vapor);
- Reduction of natural gas consumption;
- Operating simplicity

What is claimed is:

1. A process for obtaining potassium chloride, comprising steps a)-f), in order:
    a) submitting a brine to concentration, wherein the brine is a carnallite brine;
    b) separating the brine after concentration resulting in a first solid content and a first liquid content;
    c) cooling the first liquid content;
    d) separating the first liquid content after cooling, thus resulting in a second solid content and a second liquid content;
    e) enriching the second solid content; and
    f) separating the second solid content after enrichment, thus resulting in a third solid content and a third liquid content.

2. The process according to claim 1, wherein submitting the brine to concentration is performed through multistage evaporation.

3. A process for obtaining potassium chloride, comprising:
    a) submitting a brine to concentration;
    b) separating the brine after concentration resulting in a first solid content and a first liquid content;
    c) cooling the first liquid content;
    d) separating the first liquid content after cooling, thus resulting in a second solid content and a second liquid content;
    e) enriching the second solid content; and
    f) separating the second solid content after enrichment, thus resulting in a third solid content and a third liquid content, wherein submitting the brine to concentration is performed through thermal vapor recompression (TVR).

4. The process according to claim 1, wherein submitting the brine to concentration is performed through evaporation by mechanical vapor recompression (MVR).

5. The process according to claim 3, wherein submitting the brine to concentration is performed through combinations between operations of multistage evaporation and thermal vapor recompression (TVR).

6. The process according to claim 1, wherein submitting the brine to concentration is performed through a combination of operations of multistage evaporation and evaporation by mechanical vapor recompression (MVR).

7. The process according to claim 3, wherein submitting the brine to concentration is performed through a combination of operations of thermal vapor recompression (TVR) and evaporation by mechanical vapor recompression (MVR).

8. The process according to claim 1, wherein cooling the first liquid content is carried out through vacuum cooling.

9. The process according to claim 1, wherein cooling the first liquid content is carried out through cooling by means of heat exchangers.

10. The process according to claim 1, wherein cooling the first liquid content is carried out through a combination between vacuum cooling and cooling through heat exchangers.

11. The process according to claim 1, wherein enriching the second solid content is carried out through cold leaching with water.

12. The process according to claim 1, wherein enriching the second solid content is carried out through direct flotation of potassium chloride.

13. The process according to claim 1, wherein enriching the second solid content is carried out through elutriation.

14. A process for obtaining potassium chloride, comprising:
    a) submitting a brine to concentration;
    b) separating the brine after concentration resulting in a first solid content and a first liquid content;
    c) cooling the first liquid content;
    d) separating the first liquid content after cooling, thus resulting in a second solid content and a second liquid content;
    e) enriching the second solid content; and
    f) separating the second solid content after enrichment, thus resulting in a third solid content and a third liquid content,
    wherein enriching the second solid content is carried out through a combination of operations of multistage evaporation and thermal vapor recompression (TVR), and operations of multistage evaporation and evaporation by mechanical vapor recompression (MVR).

15. The process according to claim 1, further comprising, prior to submitting the brine to concentration, performing a brine preheating stage.

16. The process according to claim 15, wherein the brine preheating is performed by surface condensers.

17. The process according to claim 1, wherein the separating steps b), d) and f) comprises separating solid and liquid using centrifugation or filtration.

* * * * *